(12) United States Patent
Sasaya et al.

(10) Patent No.: US 12,437,215 B2
(45) Date of Patent: Oct. 7, 2025

(54) DEVICE, METHOD, AND COMPUTER PROGRAM PRODUCT FOR EXECUTING INFERENCE USING INPUT SIGNAL

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Tenta Sasaya, Ota (JP); Takashi Watanabe, Yokohama (JP); Toshiyuki Ono, Kawasaki (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 406 days.

(21) Appl. No.: 16/942,906

(22) Filed: Jul. 30, 2020

(65) Prior Publication Data

US 2021/0232947 A1  Jul. 29, 2021

(30) Foreign Application Priority Data

Jan. 28, 2020  (JP) .................. 2020-011348

(51) Int. Cl.
G06N 5/04 (2023.01)
G06N 20/00 (2019.01)

(52) U.S. Cl.
CPC ............... *G06N 5/04* (2013.01); *G06N 20/00* (2019.01)

(58) Field of Classification Search
CPC .................. G06N 5/04; G06N 20/00
See application file for complete search history.

(56) References Cited

U.S. PATENT DOCUMENTS

| 10,997,277 | B1* | 5/2021 | Zhou | G06N 3/047 |
| 11,615,300 | B1* | 3/2023 | Faraone | G06N 3/08 |
| | | | | 706/19 |
| 2007/0206834 | A1* | 9/2007 | Shinkai | H04N 7/181 |
| | | | | 382/103 |

(Continued)

FOREIGN PATENT DOCUMENTS

| JP | 2007-241377 A | 9/2007 |
| JP | 2009-140369 A | 6/2009 |

(Continued)

OTHER PUBLICATIONS

Kendall et al., "Multi-Task Learning Using Uncertainty to Weigh Losses for Scene Geometry and Semantics," 2018, arXiv: 1705.07115v3 [cs.CV], 14 pages (Year: 2018).*

Jean et al., "Adaptive Scheduling for Multi-Task Learning," 2019, arXiv:1909.06434v1 [cs. LG], 10 pages (Year: 2019).*

E.Gulski, et al., "Neural networks as a tool for recognition of partial discharges", IEEE Transactions on Electrical Insulation, vol. 28 No.6, Dec. 1993, pp. 984-1001.

(Continued)

*Primary Examiner* — Abdullah Al Kawsar
*Assistant Examiner* — Asher H. Jablon
(74) *Attorney, Agent, or Firm* — Oblon, McClelland, Maier & Neustadt, L.L.P.

(57) ABSTRACT

This signal processing device includes one or more processors. The processors receive, as an input, an input signal that is a third signal obtained by superposing a second signal on a first signal or a fourth signal obtained by converting the third signal, and estimate a feature of the first signal on the basis of the input signal. The processors execute inference on the basis of the feature and outputs an inference result.

10 Claims, 16 Drawing Sheets

(56) References Cited

U.S. PATENT DOCUMENTS

| | | | |
|---|---|---|---|
| 2010/0010943 A1 | 1/2010 | Ito et al. | |
| 2015/0317337 A1* | 11/2015 | Edgar | G16H 50/70 707/751 |
| 2016/0284347 A1* | 9/2016 | Sainath | G10L 15/16 |
| 2018/0190268 A1* | 7/2018 | Lee | G10L 15/02 |
| 2019/0122685 A1* | 4/2019 | Defraene | G10L 21/0216 |
| 2019/0197395 A1* | 6/2019 | Kibune | G06N 3/08 |
| 2019/0228691 A1* | 7/2019 | Bi | G01R 31/2846 |
| 2020/0074996 A1* | 3/2020 | Hamada | G10L 15/22 |
| 2021/0012212 A1* | 1/2021 | Sikka | G06N 5/04 |
| 2021/0174112 A1* | 6/2021 | Kim | G08B 13/191 |

FOREIGN PATENT DOCUMENTS

| | | |
|---|---|---|
| JP | 2010-20445 A | 1/2010 |
| JP | 2016-143043 A | 8/2016 |
| JP | 2018-31812 A | 3/2018 |
| JP | 2019-128402 A | 8/2019 |
| JP | 2019-532439 A | 11/2019 |

OTHER PUBLICATIONS

Tenta Sasaya, et al., "Development of Diagnosis Technology for Switchgear Insulation Using AI Technology 3 -Feasibility Study of Denoising Technique Using AI Technology-", Mar. 1, 2019, 3 pages (with machine generated English translation).

Ding Liu, et al., "When Image Denoising Meets High-Level Vision Tasks: A Deep Learning Approach", Proceedings of the Twenty-Seventh International Joint Conference on Artificial Intelligence Main track. pp. 842-848.

Japanese Office Action issued May 14, 2024 in Japanese Application 2020-011348, (with unedited computer-generated English translation), 4 pages.

Wortsman, M. et al., "Model soups: averaging weights of multiple fine-tuned models improves accuracy without increasing inference time", arXiv.org, Retrieved from the Internet Feb. 3, 2023: URL: https/arxiv.org/abs/2203.05482v3, 2022, 34 pages.

* cited by examiner

DEVICE, METHOD, AND COMPUTER PROGRAM PRODUCT FOR EXECUTING INFERENCE USING INPUT SIGNAL

CROSS-REFERENCE TO RELATED APPLICATIONS

This application is based upon and claims the benefit of priority from Japanese Patent Application No. 2020-011348, filed on Jan. 28, 2020; the entire contents of which are incorporated herein by reference.

FIELD

Embodiments described herein relate generally to a signal processing device, a signal processing method, and a computer program product.

BACKGROUND

In recent years, the effectiveness of neural networks focusing on natural image recognition tasks has been confirmed. It is clear that neural networks can be applied extensively, not only to natural images (two-dimensional images, or the like), but also to fault diagnosis (fault classification) in electrical installations or audio signal speaker classification, in which the input is a feature obtained by converting a one-dimensional signal (a time series signal).

Because it is assumed, with such technology, that an ideal signal not containing noise is inputted, there is a drop in classification performance in real environments where noise-containing signals may be inputted. Therefore, denoise technology for removing noise to obtain an ideal signal has been developed. A large number of methods that use a neural network have also been proposed as such denoise technology. For example, a technology in which an image with reduced noise is generated, using a neural network, from a natural image and the image thus generated is inputted to a recognition task neural network to execute a recognition task has been proposed.

However, in the prior art, it has sometimes been impossible to suitably ascertain the validity (basis for judgment, or the like) of processing results of a neural network that executes a recognition task or the like. For example, in a configuration in which a recognition task is executed upon inputting an image with reduced noise, conversely, even when the image is displayed, the user is unable to ascertain the validity of the recognition result outputted by the recognition task.

DETAILED DESCRIPTION

According to one embodiment, a signal processing device according to an embodiment includes one or more processors. The processors receive, as an input, an input signal that is a third signal obtained by superposing a second signal on a first signal or a fourth signal obtained by converting the third signal, and estimate a feature of the first signal on the basis of the input signal. The processors execute inference on the basis of the feature and outputs an inference result.

Preferred embodiments of the signal processing device will be described in detail hereinbelow with reference to the accompanying drawings.

The signal processing device according to the following embodiments can be applied to a device (a diagnostic system) for diagnosing abnormalities, faults, or states, or the like, of equipment on the basis of signals obtained from such equipment, for example. Possible examples of such a diagnostic system include systems that diagnose faults by analyzing a partial discharge signal that is generated in the event of switchgear insulation breakdown, for example. Applicable devices (systems) are not limited to such systems. For example, the signal processing device can also be applied to a device for executing a task such as audio recognition on the basis of an audio signal.

First Embodiment

The signal processing device according to the first embodiment does not output a signal that is obtained by reducing the noise of an input signal containing noise but rather outputs a feature of a signal obtained by reducing the noise of an input signal containing noise. Further, the signal processing device according to the first embodiment uses the outputted feature to execute a recognition task or the like. Because a feature rather than a signal is outputted, it is then possible to more suitably ascertain the validity of a processing result of a recognition task or the like.

Figure 1:
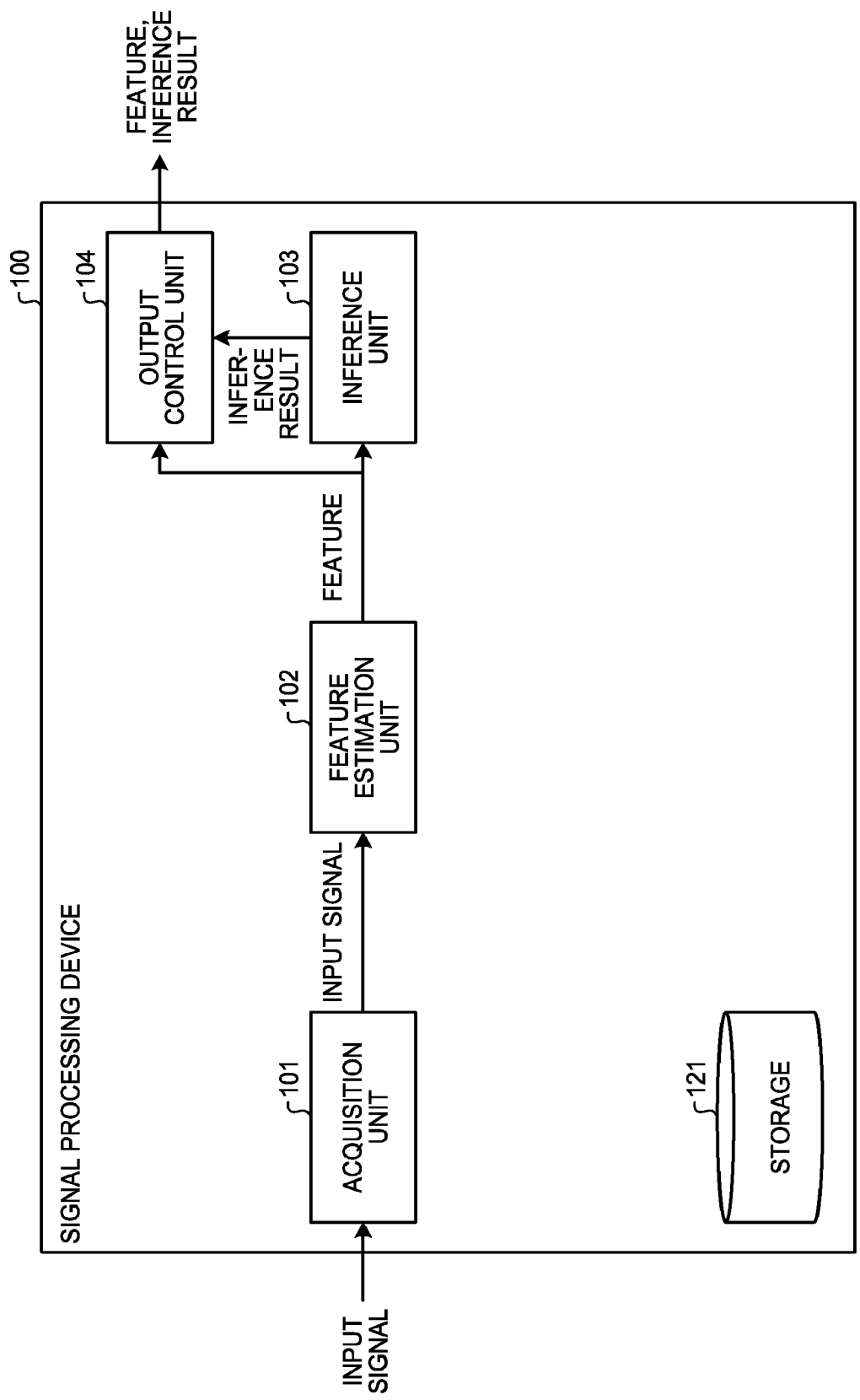
FIG. 1 is a block diagram of a signal processing device according to a first embodiment.

FIG. 1 is a block diagram illustrating an example of a configuration of a signal processing device 100 according to the first embodiment. As illustrated in FIG. 1, the signal processing device 100 comprises an acquisition unit 101, a feature estimation unit 102, an inference unit 103, an output control unit 104, and storage 121.

The acquisition unit 101 acquires various information that is used in various processing by the signal processing device 100. For example, the acquisition unit 101 acquires an input signal that is inputted to the feature estimation unit 102. The input signal is a signal (a third signal) obtained by superposing an undesired signal (a second signal) on a target signal (a first signal) or a signal (a fourth signal) obtained by converting this signal (the third signal). A signal obtained by superposing an undesired signal on a target signal may be a primary signal such as a time series signal, for example.

A target signal and an undesired signal may be in the following combinations, for example.

Combination 1:
  Target signal=a partial discharge signal (electrical signal) generated in the event of insulation breakdown of diagnosis target equipment
  Undesired signal=noise generated from equipment in the vicinity of diagnosis target equipment Combination 2:
  Target signal=an audio signal of utterance of a speaker serving as the target
  Undesired signal=an audio signal of utterance other than that of the speaker serving as the target A signal obtained by converting a signal in which an undesired signal is superposed on a target signal is, for example, a spectrogram, a scalogram, or a cepstrum.

The feature estimation unit 102 estimates the feature of the target signal on the basis of the acquired input signal. The feature estimation unit 102 uses a model (a first learning model) for learning such that the input signal is inputted and a feature of a target signal is outputted, for example, to estimate the feature. The model of the feature estimation unit 102 is, for example, any of a neural network, a support vector machine (SVM), and a random forest, or is a combination of two or more thereof.

The feature is, for example, frequency information representing the respective frequencies of a plurality of signals contained in the target signal. Frequency information is, for example, a $\phi$-q-n pattern and a spectrogram. The feature is in a different format from the format of the input signal. For example, when a spectrogram is used as the input signal, the feature estimation unit 102 estimates, as the feature, frequency information (a $\phi$-q-n pattern, for example) in a different format from the input signal. A feature such as frequency information represents a signal feature and is therefore, in comparison with the signal itself, for example, information that enables the validity of an inference processing result to be more suitably ascertained. For example, a user is able to more suitably ascertain the validity of processing by the signal processing device 100 by comparing a feature in a case where processing is performed correctly with a feature that is obtained by the signal processing device 100.

The inference unit 103 executes inference on the basis of the feature estimated by the feature estimation unit 102 and outputs an inference result. The inference unit 103 outputs the inference result by using a model (a second learning model) for learning such that an inference result is outputted upon inputting a feature, for example. The model of the inference unit 103 is, for example, any of a neural network, an SVM, and a random forest, or is a combination of two or more thereof.

In cases where the inference unit 103 performs, as inference, classification or recognition of a target signal, the inference result is, for example, a vector or a scalar value representing a classification or a recognized class (a correct answer class). When the inference unit 103 performs, as inference, captioning or machine translation of a target signal that is an audio signal, the inference result is, for example, a vector representing the index of a word constituting the correct answer. An inference result such as the index of a word of the correct class and constituting the correct answer can also be interpreted as being attribute information indicating an attribute of target information.

The output control unit 104 controls the output of various information that is obtained in various processing by the signal processing device 100. For example, the output control unit 104 outputs an inference result by the inference unit 103 and the feature that is outputted from the feature estimation unit 102 during inference, to an external device that uses the inference result and the feature, a display device, and the storage 121, or the like. The display device may also be provided in the signal processing device 100.

The storage 121 stores various information that is obtained by various processing by the signal processing device 100. For example, the storage 121 stores various information acquired by the acquisition unit 101, parameters of the model of the feature estimation unit 102, and parameters of the model of the inference unit 103. The storage 121 can be configured by various storage media that are typically used, such as a flash memory, a memory card, a random-access memory (RAM), a hard disk drive (HDD), or an optical disk.

The respective parts other than the storage 121 (the acquisition unit 101, feature estimation unit 102, inference unit 103, and output control unit 104) are realized by one or more processors, for example. For example, the foregoing parts may each be realized by causing a processor such as a central processing unit (CPU) to execute a program, that is, by software. Each of the foregoing parts may also be realized by a processor such as a dedicated integrated circuit (IC), that is, by hardware. Each of the foregoing parts may also be realized through the combined use of software and hardware. When a plurality of processors are used, the respective processors may realize one of the parts or may realize two or more of the parts.

Furthermore, the signal processing device 100 may be physically configured from one device or may be physically configured from a plurality of devices. For example, the signal processing device 100 may be constructed in a cloud environment. Furthermore, the parts in the signal processing device 100 may each be provided by being distributed among a plurality of devices. For example, the signal processing device 100 (the signal processing system) may be configured to comprise devices (diagnosis target equipment, for example) provided with functions required for feature estimation (the acquisition unit 101, feature estimation unit 102, and the like) and a device (a server device or the like, for example) provided with a function required for inference (the inference unit 103 or the like).

Figure 2:
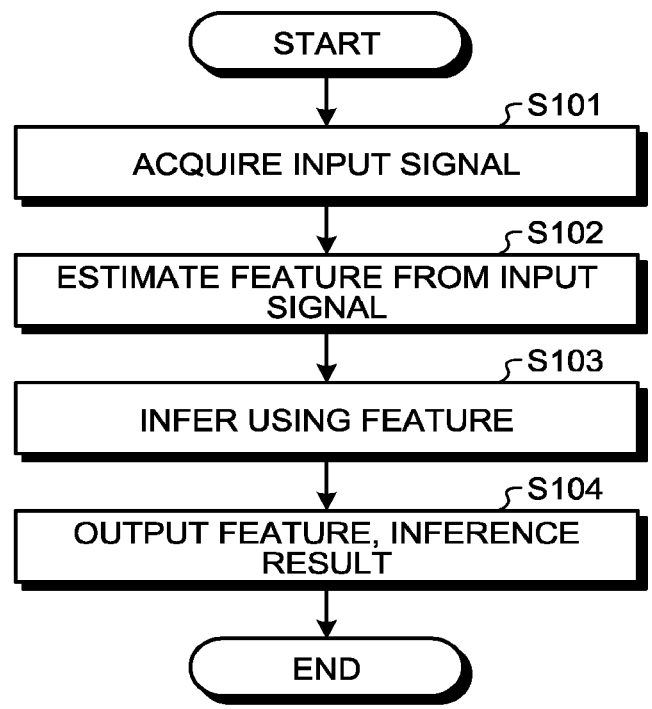
FIG. 2 is a flowchart of signal processing according to the first embodiment.

Next, signal processing by the signal processing device 100 according to the first embodiment that is thus configured will be described. FIG. 2 is a flowchart illustrating an example of signal processing according to the first embodiment.

The acquisition unit 101 acquires an input signal (step S101). The feature estimation unit 102 uses a model of the feature estimation unit 102 that has previously performed learning to estimate a feature from the acquired input signal (step S102). The inference unit 103 uses a model of the inference unit 103 that has previously performed learning to execute inference using the estimated feature (step S103). The output control unit 104 outputs the estimated feature and the inference result by the inference unit 103 (step S104). The output control unit 104 outputs (displays) the estimated feature to a display device, for example. For example, the user is able to ascertain the validity of the inference result by the inference unit 103 by referring to the displayed feature.

Thus, according to the first embodiment, a feature of a signal obtained by reducing the noise of an input signal containing noise is outputted in processing prior to inference by the inference unit. Furthermore, this feature is outputted by the output control unit. Accordingly, the validity of the inference result of the inference unit can be more suitably ascertained.

Second Embodiment

A signal processing device according to a second embodiment further comprises a function for learning a model of a feature estimation unit 102 and a model of an inference unit 103.

Figure 3:
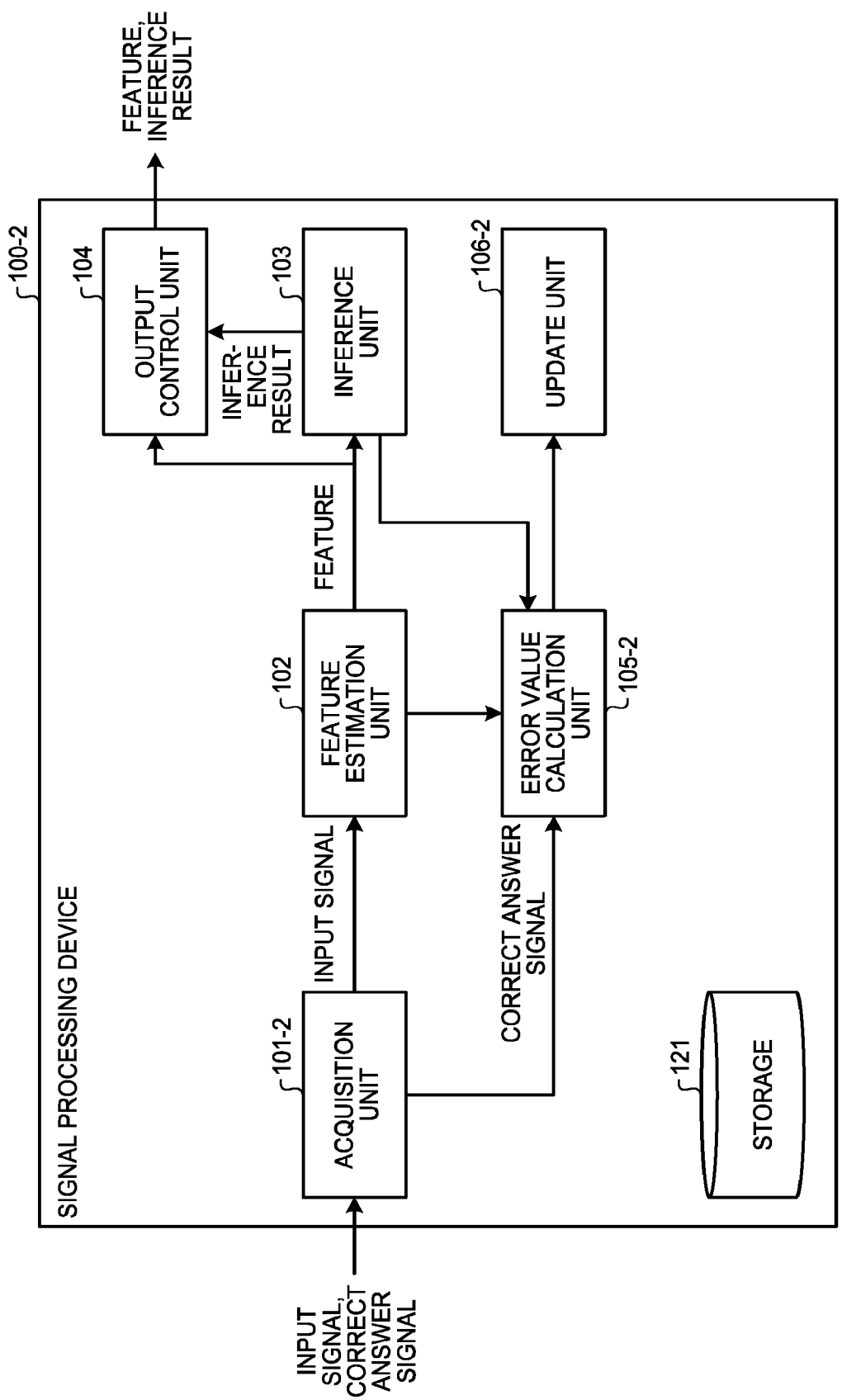
FIG. 3 is a block diagram of a signal processing device according to a second embodiment.

FIG. 3 is a block diagram illustrating an example of a configuration of a signal processing device 100-2 according to the second embodiment. As illustrated in FIG. 3, the signal processing device 100-2 comprises an acquisition unit 101-2, a feature estimation unit 102, an inference unit 103, an output control unit 104, an error value calculation unit 105-2, an update unit 106-2, and storage 121.

The second embodiment differs from the first embodiment in the function of the acquisition unit 101-2 and in that the error value calculation unit 105-2 and the update unit 106-2 have been added. The remaining configuration and functions are as per FIG. 1, which is a block diagram of the signal processing device 100 according to the first embodiment, and hence the same reference signs are assigned and a description thereof is omitted here.

The acquisition unit 101-2 differs from the acquisition unit 101 according to the first embodiment in that a correct answer signal used for learning is also acquired. For example, the acquisition unit 101-2 acquires the target signal contained in the input signal as a correct answer signal (first correct answer signal) that is used for the learning of the model of the feature estimation unit 102. Furthermore, the acquisition unit 101-2 acquires, as a correct answer signal (second correct answer signal) that is used for the learning of the model of the inference unit 103, an inference result of the target signal contained in the input signal (the index of a word of the correct class and constituting the correct answer, or the like).

The error value calculation unit 105-2 calculates error values that are used for learning. For example, the error value calculation unit 105-2 calculates, as an error value that is used for the learning of the model of the feature estimation unit 102, a correct answer signal representing the feature of the target signal and an error value EA (a first error value) from the feature estimated by the feature estimation unit 102. Furthermore, the error value calculation unit 105-2 calculates, as an error value that is used for the learning of the model of the inference unit 103, an error value EB (a second error value) between the correct answer signal of the inference based on the feature and the inference result outputted by the inference unit 103.

The error value calculation unit 105-2 may also calculate only the error value that is required for the learning of the model constituting the learning target among the foregoing two types of error values.

Error value EA, which is used for the learning of the model of the feature estimation unit 102 can, for example, be an index of any of the following or a combination of two or more thereof.

L1 loss
L2 loss
Charbonnier loss.
Huber loss
Bray-Curtis distance
Canberra distance
Earth Mover Distance (Wasserstein Distance)
Cosine resemblance
Histogram Intersection
KL divergence
Js divergence Error value EB, which is used for the learning of the model of the inference unit 103, is cross entropy, for example.

The update unit 106-2 updates the parameters of the corresponding model by using the error value calculated by the error value calculation unit 105-2. For example, upon learning the model of the feature estimation unit 102, the update unit 106-2 updates the parameters of the model to further minimize the error value by using at least one of error value EA and error value EB. Furthermore, upon learning the model of the inference unit 103, the update unit 106-2 updates the parameters of the model to further minimize the error value by using error value EB.

Thus, the update unit 106-2 executes at least one of processing to update the parameters of the model of the feature estimation unit 102 on the basis of at least one of error value EA and error value EB, and processing to update the parameters of the model of the inference unit 103 on the basis of error value EB.

The learning method may be any kind of method enabling adaptation to the model used. For example, when the model is a neural network, the update unit 106-2 is capable of using stochastic gradient descent to update the parameters of the neural network.

Figure 4:
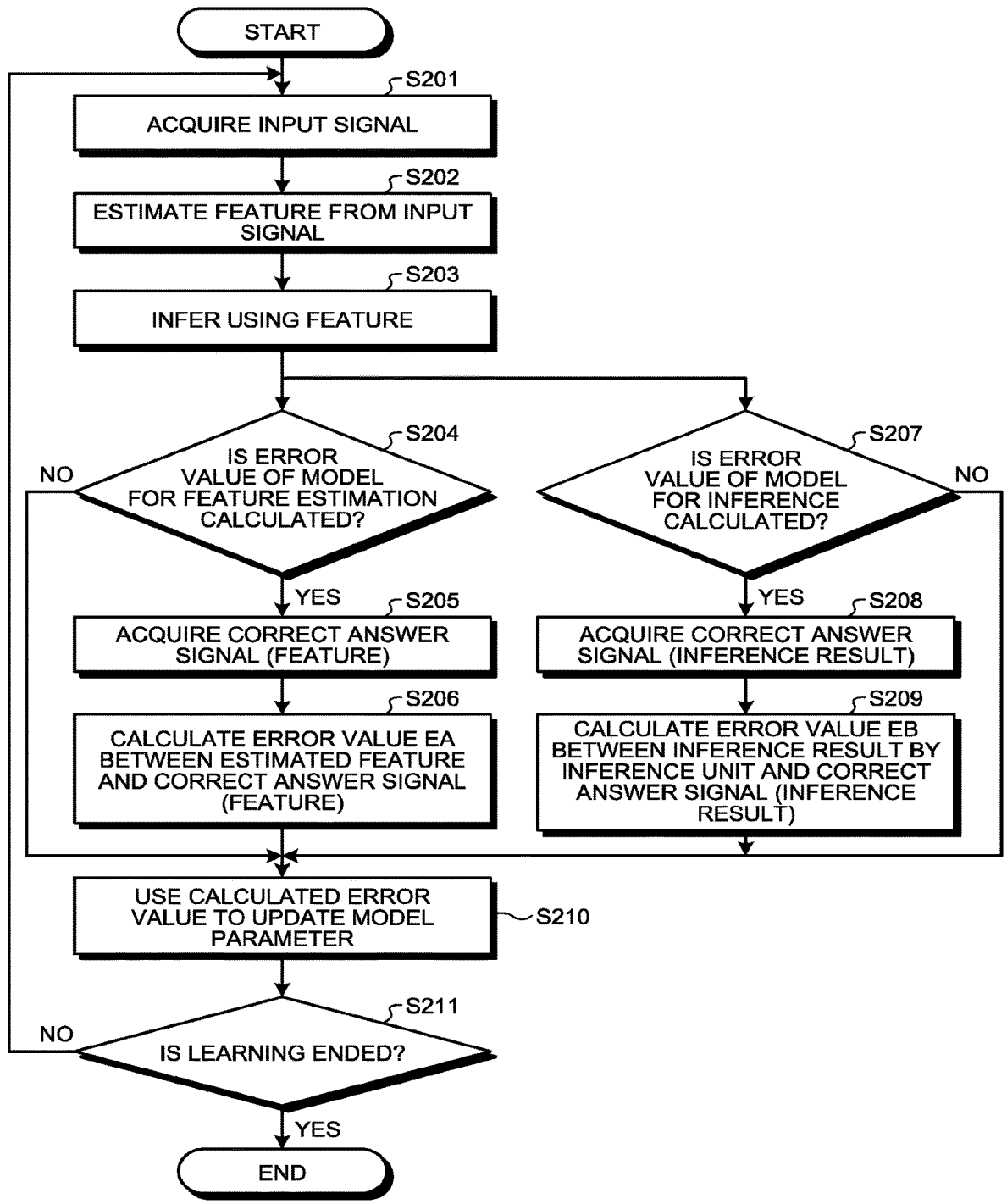
FIG. 4 is a flowchart of learning processing according to the second embodiment.

Next, learning processing by the signal processing device 100-2 according to the second embodiment that is thus configured will be described next using FIG. 4. FIG. 4 is a flowchart illustrating an example of learning processing according to the second embodiment.

The acquisition unit 101-2 acquires an input signal (step S201). The feature estimation unit 102 uses a model of the feature estimation unit 102 to estimate a feature from the acquired input signal (step S202). The inference unit 103 uses a model of the inference unit 103 to execute inference using the estimated feature (step S203).

The update unit 106-2 determines whether or not to calculate the error value of the model of the feature estimation unit 102 (step S204). For example, the update unit 106-2 refers to setting information indicating whether to learn the model of the feature estimation unit 102 or the model of the inference unit 103, and in a case where a setting to learn the model of the feature estimation unit 102 has been made, determines that the error value of the model of the feature estimation unit 102 is to be calculated. Setting information may be pre-stored in the storage 121 or the like or may be designated by the user or the like.

If it has been determined that the error value of the model of the feature estimation unit 102 is to be calculated (step S204: Yes), the acquisition unit 101-2 acquires the feature of the correct answer signal that is used for the learning of the model of the feature estimation unit 102 (step S205). The correct answer signal is a signal that is determined in advance as the correct answer to the input signal acquired in step S201, for example. The error value calculation unit 105-2 calculates error value EA between the feature estimated by the feature estimation unit 102 and the feature constituting the correct answer signal (step S206).

The following processing from step S207 to step S209 for the model of inference unit 103 is executed independently of the processing from step S204 to step S206. Note that this processing may also be executed in parallel as illustrated in FIG. 4. The latter processing may also be executed after the former processing.

The update unit 106-2 determines whether or not to calculate the error value of the model of the inference unit 103 (step S207). For example, the update unit 106-2 refers to setting information or the like, and in a case where a setting to learn the model of the inference unit 103 has been made, determines that the error value of the model of the inference unit 103 is to be calculated.

In cases where a determination to calculate the error value of the model of the inference unit 103 has been made (step S207: Yes), the acquisition unit 101-2 acquires an inference result constituting a correct answer signal that is used for the learning of the model of the inference unit 103 (step S208). The error value calculation unit 105-2 calculates error value EB between the inference result outputted by the inference unit 103 and the inference result constituting the correct answer signal (step S209).

In cases where a determination to not calculate the error value of the model of the feature estimation unit 102 has been made (step S204: No) and in cases where a determination to not calculate the error value of the model of the inference unit 103 has been made (step S207: No), after calculating error value EA (step S206) and after calculating error value EB (step S209), the update unit 106-2 uses the calculated error values to update the parameters of the model that has been designated for learning (step S210).

For example, in a case where learning of the model of the feature estimation unit 102 is designated by using both error value EA and error value EB, the update unit 106-2 updates the parameters of the model of the feature estimation unit 102 in order to further minimize an error value that includes both error value EA and error value EB. The error value that includes both error value EA and error value EB is calculated by multiplying at least one of error value EA and error value EB by an adjustment factor and finding the sum of the multiplied error value EA and error value EB, for example.

The adjustment factor is set at a value so that error value EA after the adjustment factor have been multiplied is the larger than error value EB after the adjustment factor have been multiplied, for example. When error value EB is large, the learning of the feature estimation unit 102 does not progress and the feature accuracy sometimes does not improve. By performing adjustment so that error value EA is large, stagnation of learning can be prevented. Moreover, the adjustment factor may be set dynamically so that error value EB increases with an ever-increasing frequency of updates to the parameters of the learning model of the feature estimation unit 102. For example, the update unit 106-2 may modify the value of the adjustment factor so that, as the update frequency increases, error value EA after being multiplied by the adjustment factor is reduced and error value EB after being multiplied by the adjustment factor increases. Thus, because it is then possible to maintain the feature accuracy while preferentially restoring the part the inference unit 103 is focused on, a highly interpretable feature is then outputted.

In cases where learning of the model of the feature estimation unit 102 by using error value EA or error value EB has been designated, the update unit 106-2 updates the parameters of the model of the feature estimation unit 102 in order to further minimize the designated error value. In such cases, the adjustment factor is not used.

Furthermore, in cases where learning of the model of the inference unit 103 by using error value EB has been designated, the update unit 106-2 updates the parameters of the model of the inference unit 103 in order to further minimize error value EB.

In cases where learning of both the model of the feature estimation unit 102 and the model of the inference unit 103 have been designated, the update unit 106-2 learns both models.

Note that learning the model of the feature estimation unit 102 so as to minimize error value EA means learning the model of the feature estimation unit 102 in order to improve the feature reconstruction accuracy. Furthermore, learning the model of the inference unit 103 so as to minimize error value EB means learning the model of the inference unit 103 in order to improve the inference accuracy.

The update unit 106-2 determines whether or not to end the learning (step S211). For example, the update unit 106-2 determines to end the learning according to whether the frequency of learning repetition has reached an upper limit value, or the like. If learning is not ended (step S211: No), the operation returns to step S201 and the processing is repeated. When the learning is ended (step S211: Yes), the learning processing of FIG. 4 ends.

Thus, in the case of the signal processing device according to the second embodiment, inference using the model of the inference unit 103 with respect to an input signal containing noise is possible, and each model can be learned in order to improve the feature reconstruction accuracy constituting the basis for judging inference.

Third Embodiment

In a third embodiment, a feature estimation unit uses two or more models to estimate the feature. Although an example in which two models are used is described hereinbelow, the same procedure can also be adopted for three or more models.

Figure 5:
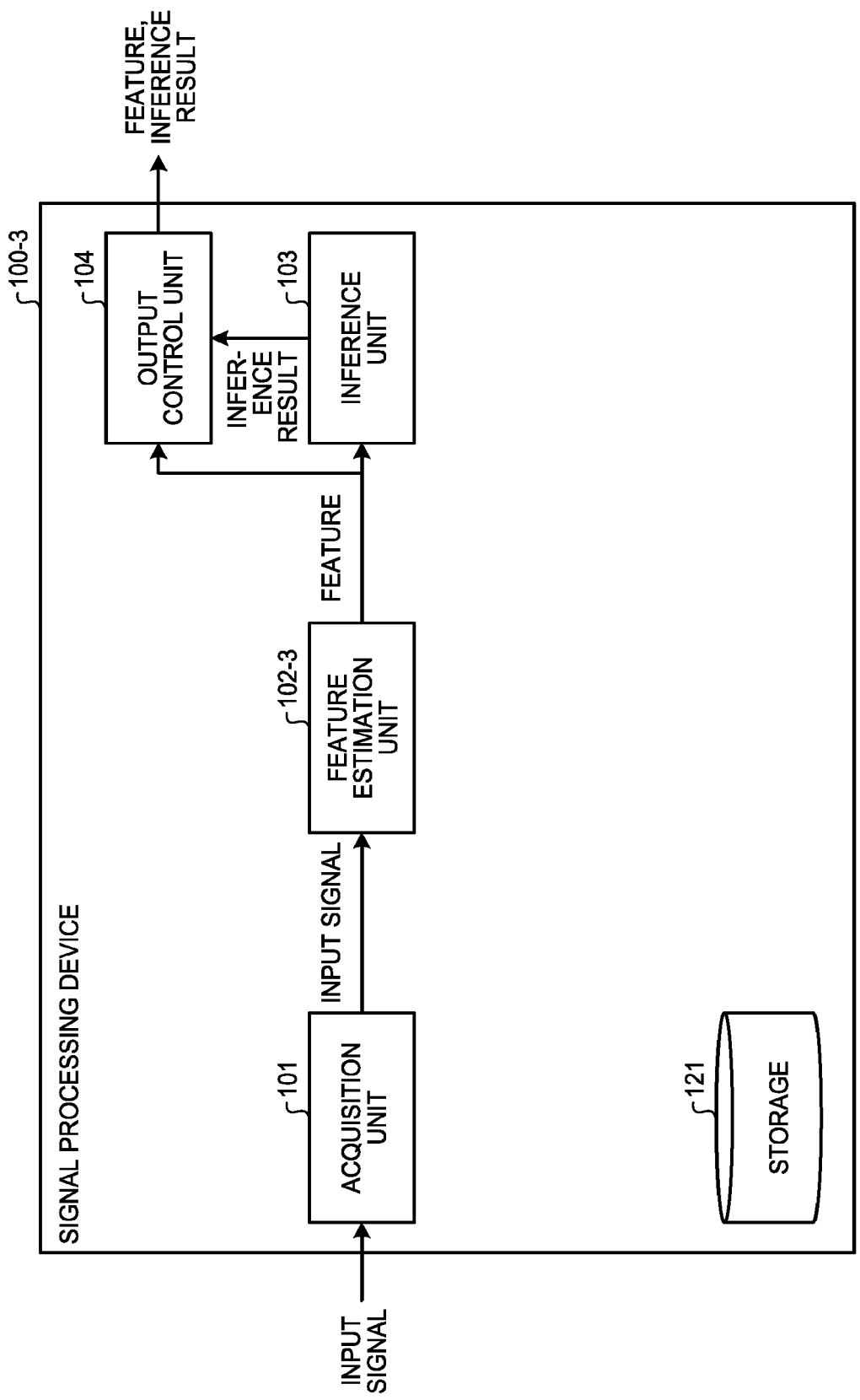
FIG. 5 is a block diagram of a signal processing device according to a third embodiment.

FIG. 5 is a block diagram illustrating an example of the configuration of a signal processing device 100-3 according to the third embodiment. As illustrated in FIG. 5, the signal processing device 100-3 comprises an acquisition unit 101, a feature estimation unit 102-3, an inference unit 103, an output control unit 104, and storage 121.

In the third embodiment, the functions of the feature estimation unit 102-3 differ from those of the first embodiment. The remaining configuration and functions are as per FIG. 1, which is a block diagram of the signal processing device 100 according to the first embodiment, and hence the same reference signs are assigned and a description thereof is omitted here.

Figure 6:
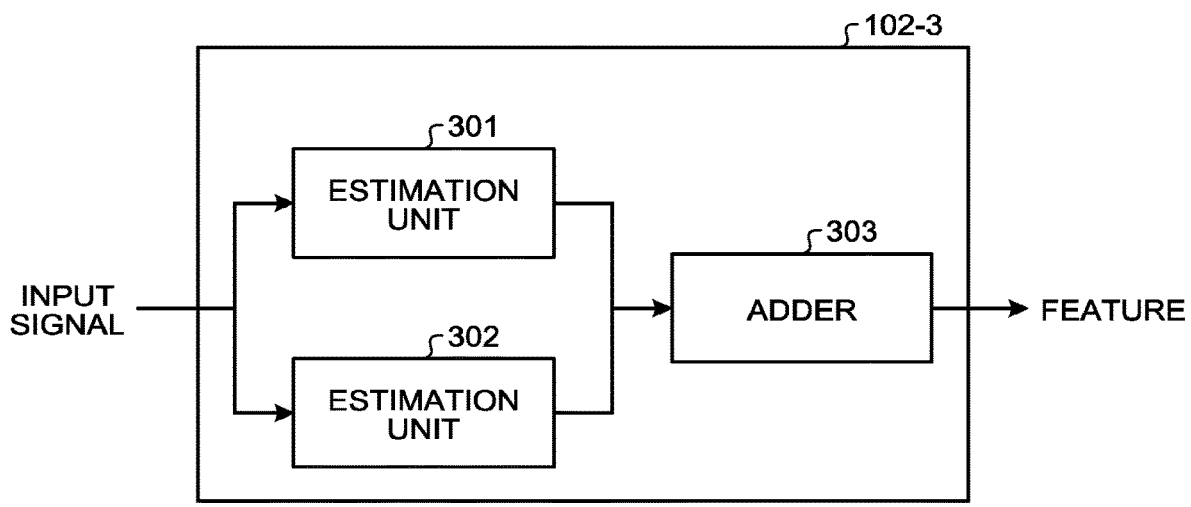
FIG. 6 is a block diagram of a feature estimation unit according to the third embodiment.

FIG. 6 is a block diagram illustrating an example of the configuration of the feature estimation unit 102-3. As illustrated in FIG. 6, the feature estimation unit 102-3 comprises estimation units 301, 302, and an adder 303.

The estimation unit 301 estimates the feature by using a model MA, which is one of a plurality of models for feature estimation. The estimation unit 302 estimates the feature by using a model MB, which is different from model MA, among the plurality of models for feature estimation. Note that the information (parameters and the like) of the plurality of models for feature estimation is stored in the storage 121, for example.

Learning is performed such that model MA and model MB have the same structure but different parameters, for example. For example, model MA and model MB are determined by updating the respective parameters of models with the same structure on the basis of two error values based on mutually different indices among a plurality of indices of the foregoing error value EA. Model MA and model MB may also be determined by updating the respective parameters of models with the same structure on the basis of two error values that have been determined using mutually different values as adjustment factors by which at least one of error value EA and error value EB is/are multiplied.

For example, model MA may be learned by using an adjustment factor that is set so that error value EA is larger, and model MB may be learned by using an adjustment factor that is set so that error value EB is larger. Thus, model MA then constitutes a model for learning to further improve feature reconstruction accuracy. Further, model MB then constitutes a model for learning to further improve inference accuracy.

The adder 303 performs addition processing on the basis of one or more weighting factors. For example, the adder 303 multiplies at least one of a feature FA that is obtained on the basis of model MA and a feature FB that is obtained on the basis of model MB by a weighting factor and outputs a value obtained by adding together feature FA and feature FB for each element as an estimation result for the feature of the input signal.

For example, the adder 303 uses any of equations (1) to (3) below to calculate a feature F that is obtained by adding together feature FA based on model MA and feature FB based on model MB. $\alpha_1$ and $\beta_1$ are the weighting factors.

$$F=\alpha_1 FA+FB \quad (1)$$

$$F=FA+\alpha_1 FB \quad (2)$$

$$F=\alpha_1 FA+\beta_1 FB \quad (3)$$

Figure 7:
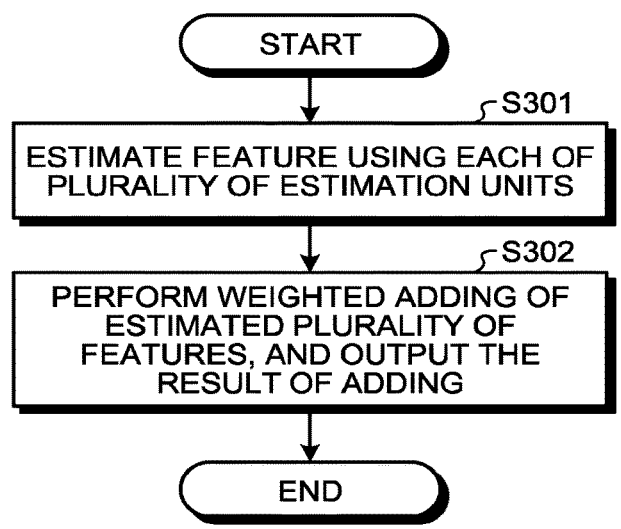
FIG. 7 is a flowchart of feature estimation processing according to the third embodiment.

The overall flow of the signal processing by the signal processing device 100-3 according to the third embodiment is as per FIG. 2 that illustrates an example of signal processing by the signal processing device 100 according to the first embodiment. In the third embodiment, the specific processing of step S102 (hereinafter called feature estimation processing) of the signal processing illustrated in FIG. 2, for example, differs from the first embodiment. FIG. 7 is a flowchart illustrating an example of the feature estimation processing according to the third embodiment.

The estimation unit 301 estimates the feature from the input signal on the basis of model MA and the estimation unit 302 estimates the feature from the input signal on the basis of model MB (step S301). The adder 303 uses weighting to add together the plurality of features estimated by the estimation unit 301 and estimation unit 302 respectively, outputting the result of adding as the feature of the input signal (step S302).

Thus, in the third embodiment, the feature is estimated by using two or more models. By suitably setting two or more models and weighting factors for when the features estimated by the two or more models are weighted, a signal processing device can be configured to establish a desired feature reconstruction accuracy and a desired inference accuracy.

Fourth Embodiment

In a fourth embodiment, as per the third embodiment, a feature estimation unit uses two or more models to estimate the feature. In the third embodiment, a plurality of features estimated using two or more models are added together using weighting. In this embodiment, however, one model is generated by adding, using weighting, the parameters of two or more models, and the feature is estimated by using the model thus generated. Although an example in which two models are used is described hereinbelow, the same procedure can also be adopted for three or more models.

Figure 8:
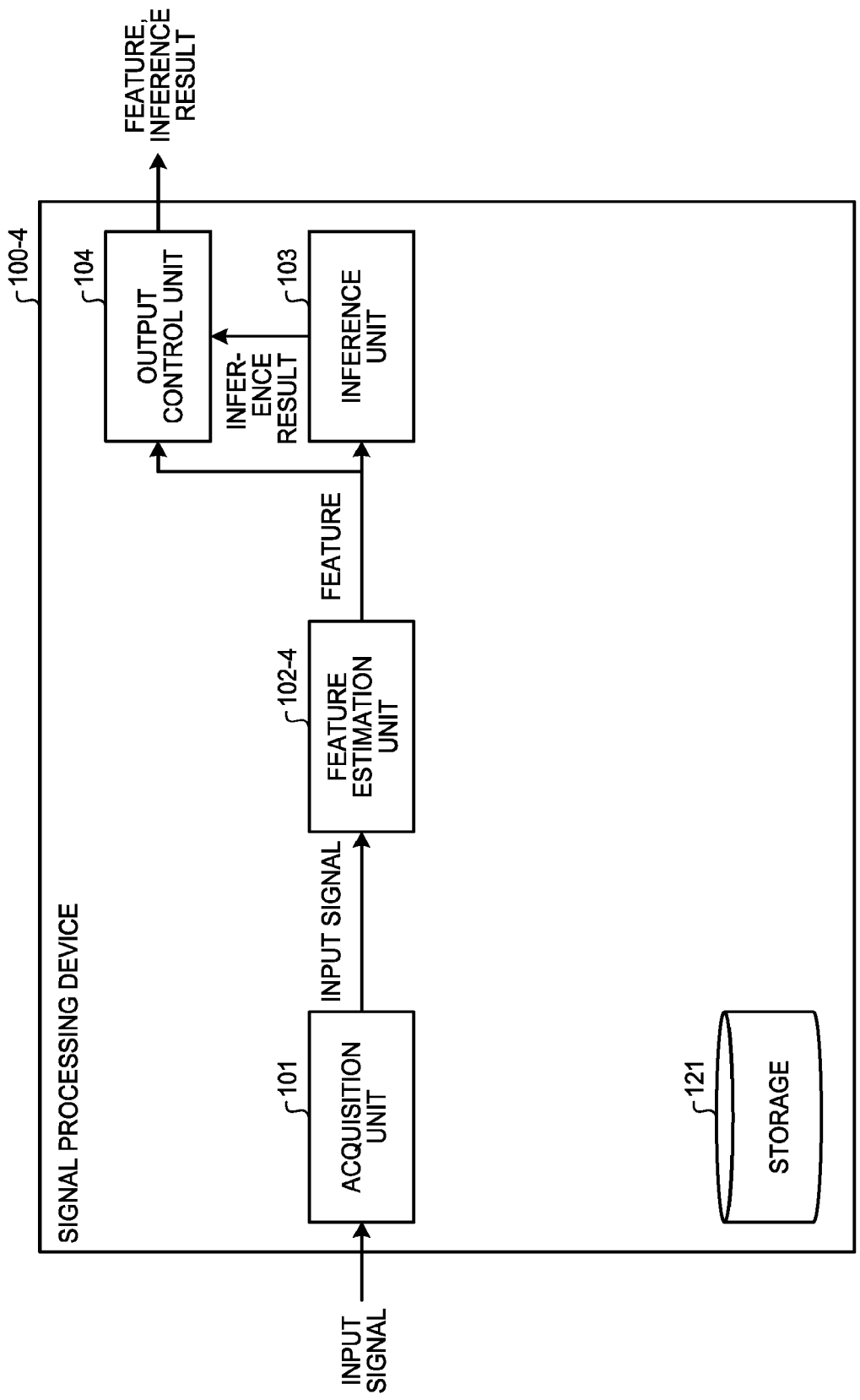
FIG. 8 is a block diagram of a signal processing device according to a fourth embodiment.

FIG. 8 is a block diagram illustrating an example of the configuration of a signal processing device 100-4 according to the fourth embodiment. As illustrated in FIG. 8, the signal processing device 100-4 comprises an acquisition unit 101, a feature estimation unit 102-4, an inference unit 103, an output control unit 104, and storage 121.

In the third embodiment, the functions of the feature estimation unit 102-4 differ from those of the first embodiment. The remaining configuration and functions are as per FIG. 1, which is a block diagram of the signal processing device 100 according to the first embodiment, and hence the same reference signs are assigned and a description thereof is omitted here.

Figure 9:
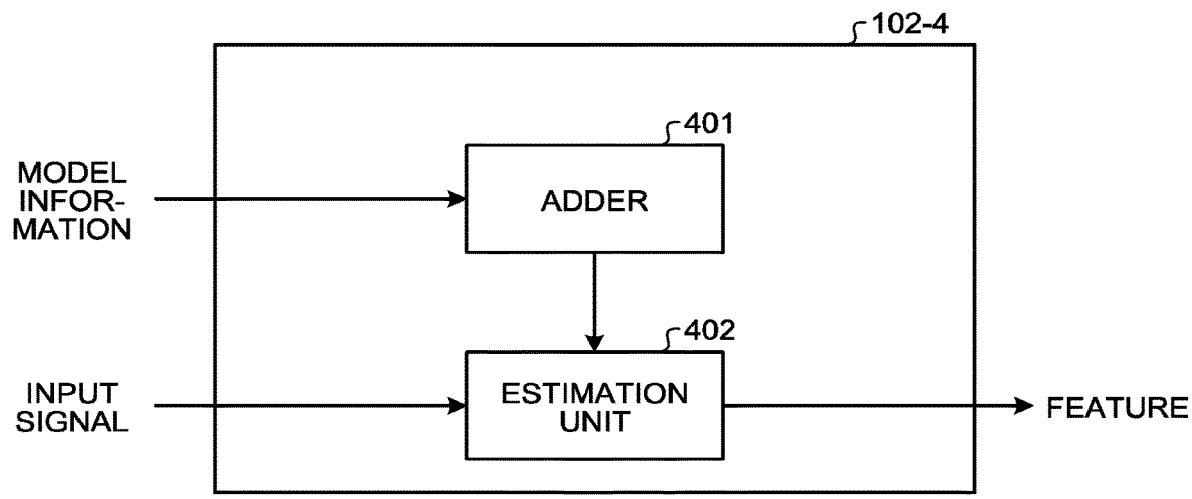
FIG. 9 is a block diagram of a feature estimation unit according to the fourth embodiment.

FIG. 9 is a block diagram illustrating an example of the configuration of the feature estimation unit 102-4. As illustrated in FIG. 9, the feature estimation unit 102-4 comprises an adder 401 and an estimation unit 402.

The adder 401 performs addition processing on the basis of one or more weighting factors. For example, the adder 401 performs weighted addition of the parameters of model MA and model MB, which are two of a plurality of models for feature estimation. Note that the information (parameters and the like) of the plurality of models for feature estimation is stored in the storage 121, for example. As per the third embodiment, learning is performed such that model MA and model MB have the same structure but different parameters, for example.

For example, the adder 401 uses equation (4) or equation (5) below to calculate a parameter w that is obtained by adding a parameter $w_1$ of model MA and a parameter $w_2$ of model MB. $\alpha_2$ and $\beta_2$ are the weighting factors.

$$w=\alpha_2 w_1+(1-\alpha_2)w_2 \quad (4)$$

$$w=\alpha_2 w_1+\beta_2 w_2 \quad (5)$$

Note that equation (4) can be interpreted as an equation for interpolation of the two models using weighting factor $\alpha_2$.

The estimation unit 402 uses a model having the parameters obtained by the adder 401 to estimate the feature and outputs same as an estimation result for the feature of the input signal.

Figure 10:
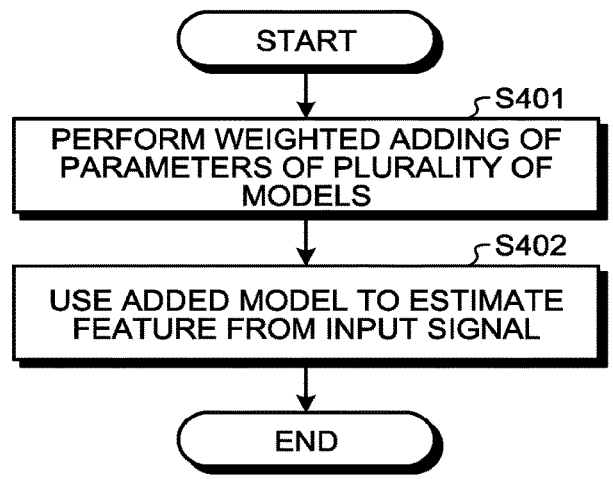
FIG. 10 is a flowchart of feature estimation processing according to the fourth embodiment.

The overall flow of the signal processing by the signal processing device 100-4 according to the fourth embodiment is as per FIG. 2 that illustrates an example of signal processing by the signal processing device 100 according to the first embodiment. In the fourth embodiment, the specific processing of step S102 (feature estimation processing) of the signal processing illustrated in FIG. 2, for example, differs from the first embodiment. FIG. 10 is a flowchart illustrating an example of the feature estimation processing according to the fourth embodiment.

The adder 401 acquires model information (parameters and the like) of two models from the storage 121, for example, and performs weighted addition of the parameters of the two models (step S401). The estimation unit 402 inputs the input signal to one model that includes the parameters obtained using the weighted addition and estimates the feature (step S402).

Thus, in the fourth embodiment, the feature is estimated by using two or more models. By suitably setting two or more models and weighting factors for when the parameters of the two or more models are weighted, a signal processing device can be configured to establish a desired feature reconstruction accuracy and a desired inference accuracy.

Fifth Embodiment

The signal processing device according to a fifth embodiment outputs a model-derived processing result (feature, inference result, or the like) in order to enable the validity (basis for judgment, or the like) of the processing result to be more suitably ascertained.

Figure 11:
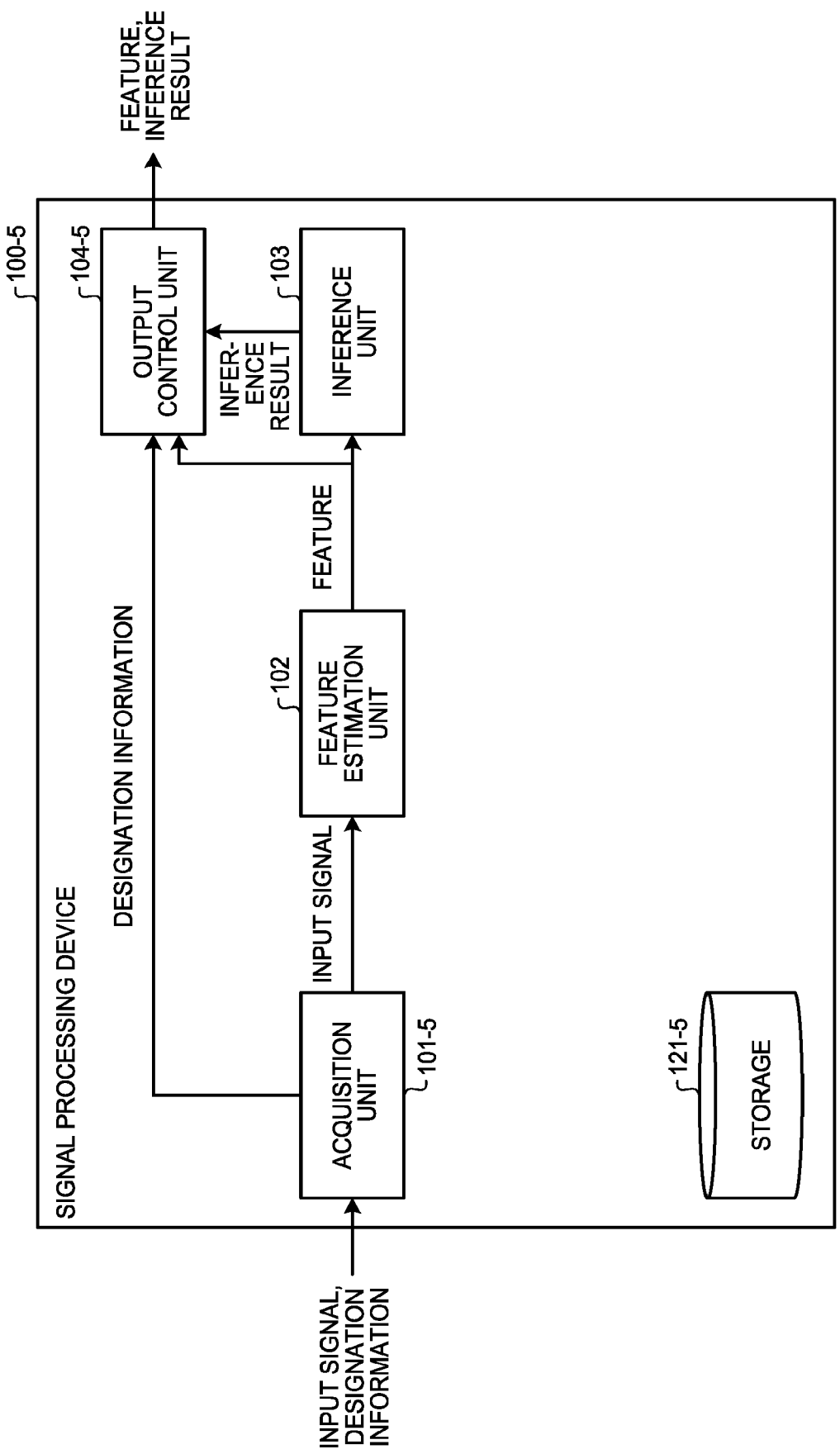
FIG. 11 is a block diagram of a signal processing device according to a fifth embodiment.

FIG. 11 is a block diagram illustrating an example of a configuration of a signal processing device 100-5 according to a fifth embodiment. As illustrated in FIG. 11, the signal processing device 100-5 comprises an acquisition unit 101-5, a feature estimation unit 102, an inference unit 103, an output control unit 104-5, and storage 121-5.

In the fifth embodiment, the functions of the acquisition unit 101-5, the output control unit 104-5, and the storage 121-5 differ from the first embodiment. The remaining configuration and functions are as per FIG. 1, which is a block diagram of the signal processing device 100 according to the first embodiment, and hence the same reference signs are assigned and a description thereof is omitted here.

The storage 121-5 differs from the storage 121 according to the first embodiment in further storing a plurality of storage data that associates the feature of the target signal with an inference result based on the feature.

The acquisition unit 101-5 differs from the acquisition unit 101 according to the first embodiment in further acquiring at least one of the weighting factors used and designation information designating the model used.

Note that the weighting factors mean the weighting factors that are used in the third embodiment and in the fourth embodiment, for example. Therefore, when weighting factors are used, the feature estimation unit 102 according to this embodiment is replaced with the feature estimation unit 102-3 of the third embodiment or the feature estimation unit 102-4 of the fourth embodiment.

The output control unit 104-5 further comprises a function for outputting, to a display device or the like, display information for enabling the validity of a model-derived processing result to be ascertained. For example, the output control unit 104-5 displays, according to acquired designation information, at least one among the feature estimated by the feature estimation unit 102, the inference result outputted by the inference unit 103, a feature contained in stored data, and an inference result contained in stored data.

For example, the output control unit 104-5 reads, from the storage 121-5 among stored data that is stored in the storage 121-5, one or more stored data that include features similar to the feature obtained through signal processing and displays the stored data thus read along with at least one of the feature obtained through signal processing and an inference result.

Figure 12:
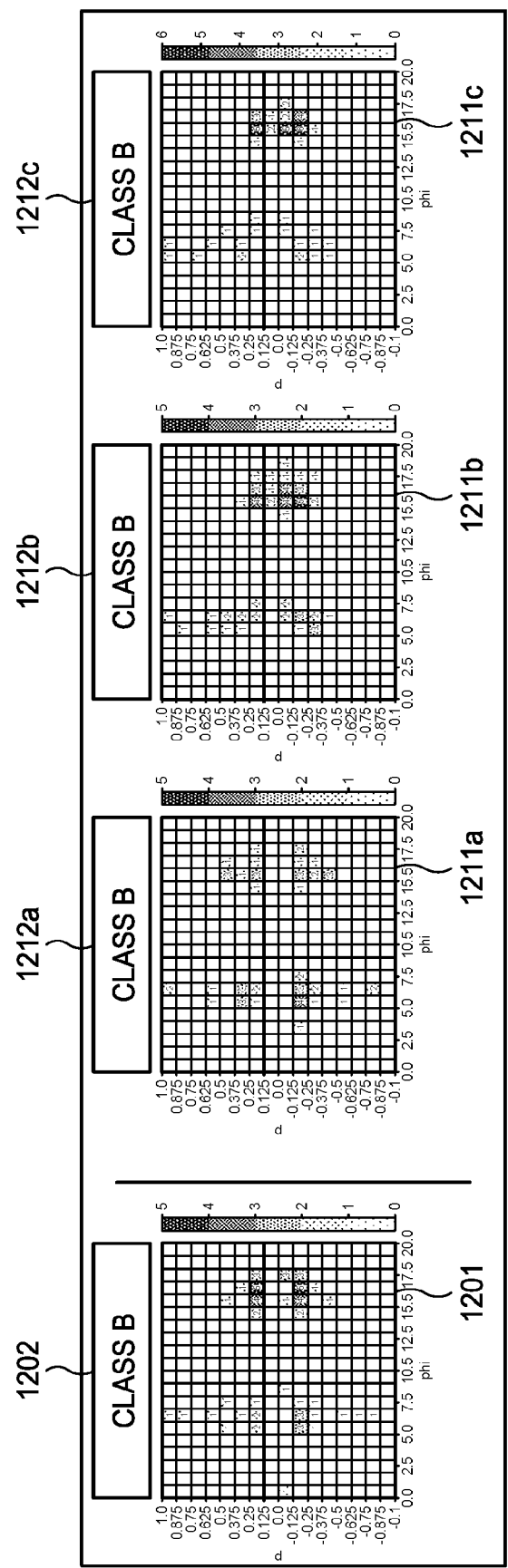
FIG. 12 is a diagram illustrating an example of a display screen.

FIG. 12 is a diagram illustrating an example of a screen that is displayed. FIG. 12 illustrates an example of a screen that displays ϕ-q-n patterns as features and displays classes classified as inference results.

The feature 1201 and inference result 1202 represent the feature estimated by the feature estimation unit 102 and the inference result outputted by the inference unit 103, respectively. The features 1211*a* to 1211*c* and inference results 1212*a* to 1212*c* that are displayed to the right of the foregoing are features and inference results that are contained in stored data that include three features that are selected in descending order of error value (similarity) with respect to the feature 1201 among the stored data stored in the storage 121-5. The number of similar stored data is not limited to three.

As illustrated in FIG. 12, the output control unit 104-5 may display the respective features such that the coordinate axes displaying the respective features coincide with one another. FIG. 12 illustrates an example in which horizontal axis (phase ϕ axis) baselines for features constituting ϕ-q-n patterns are displayed in alignment.

Furthermore, the output control unit 104-5 may modify the display according to designated weighting factors. For example, the output control unit 104-5 displays features and inference results for which signal processing has been executed using weighting factors designated by designation information. In cases where the designation information has been modified, the output control unit 104-5 switches the display using features and inference results for when signal processing has been executed using weighting factors designated by the modified designation information.

Figure 13:
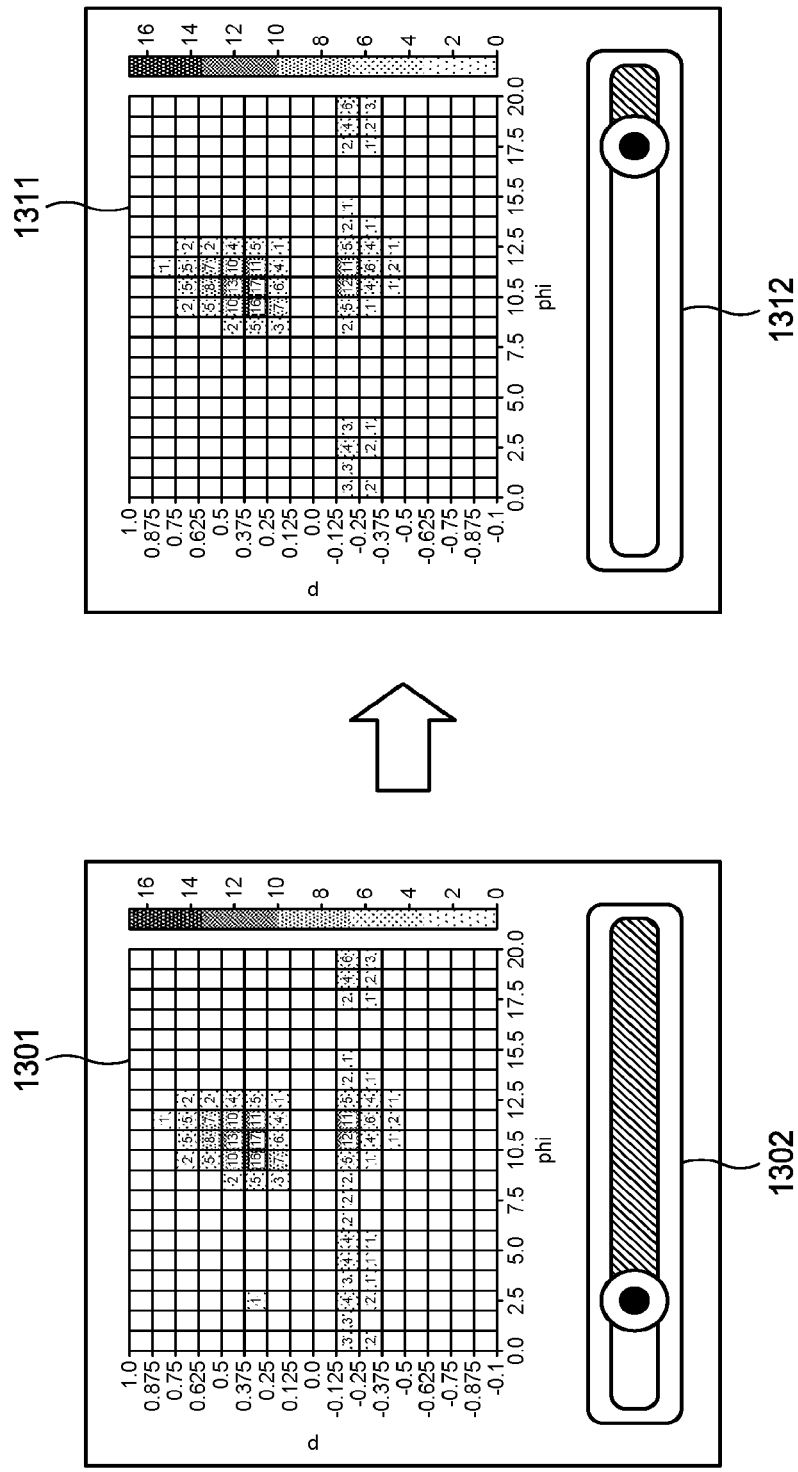
FIG. 13 is a diagram illustrating an example in which a display screen is switched.

FIG. 13 is a diagram illustrating an example in which a display screen is switched. A slide bar 1302 is used to designate a weighting factor. A feature 1301 represents a feature that is obtained in processing using a weighting factor designated using the slide bar 1302. For example, as the slide bar is moved to the right, the weighting factor value is set such that feature FB based on model MB after multiplication by the weighting factor becomes greater than feature FA based on model MA.

Thus, a feature in a case where the effect of model MB has been increased can be displayed. FIG. 13 displays an example of a feature 1311 for when the weighting factor designation has been modified as indicated by a slide bar 1312. In cases where model MB is a model for learning to achieve improved inference accuracy, the pixels of interest in the inference by the inference unit 103 among the pixels of the ϕ-q-n pattern are displayed highlighted. Accordingly, the validity (basis for judgment, or the like) of the results of the model for executing inference can be more suitably ascertained.

Note that the display methods of FIGS. 12 and 13 may also be combined. For example, the output control unit 104-5 may display slide bar 1302 as per FIG. 13 below the feature 1201 of FIG. 12 to enable designation of the weighting factor.

Figure 14:
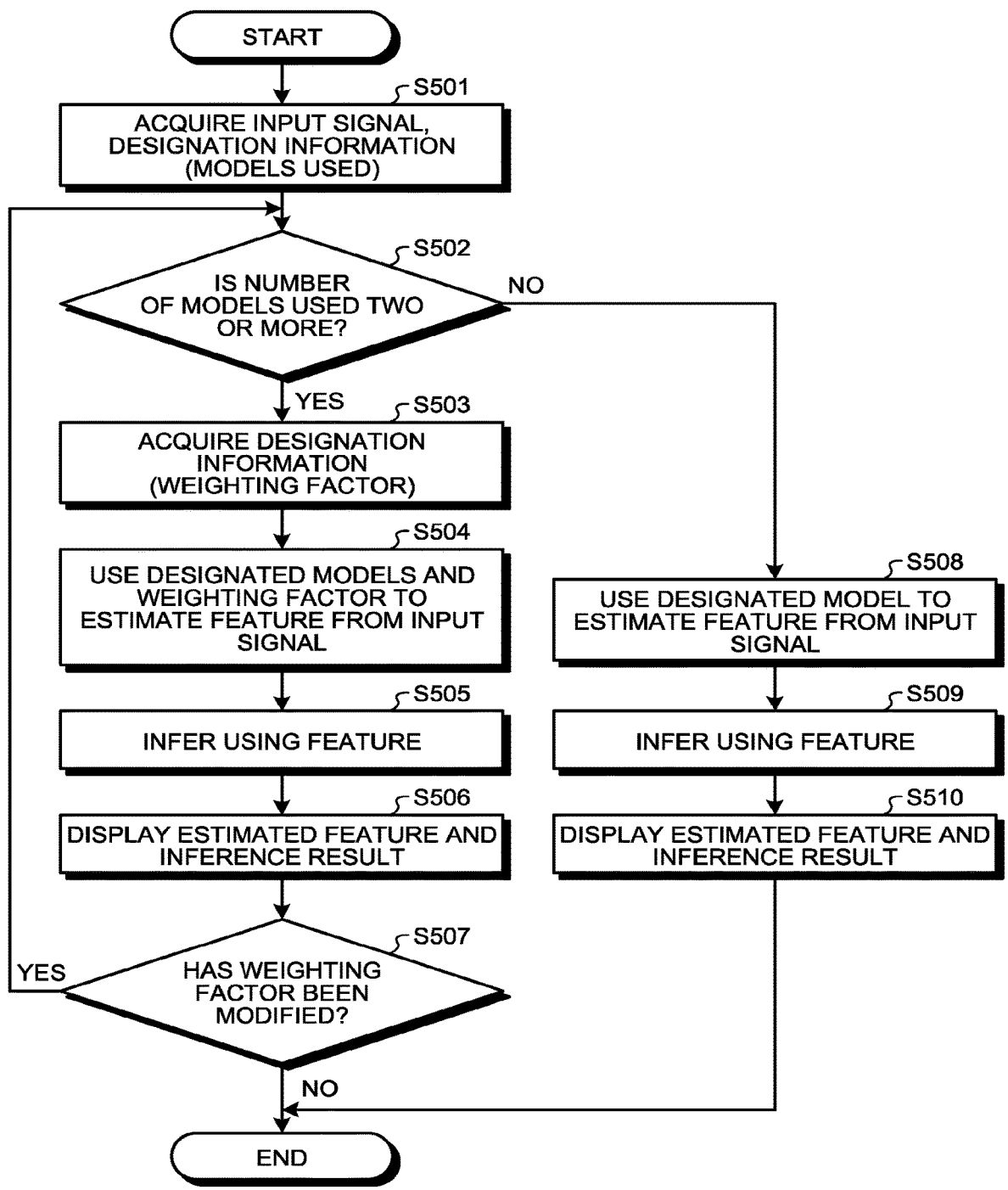
FIG. 14 is a flowchart of signal processing according to the fifth embodiment.

Next, signal processing by the signal processing device 100-5 according to a fifth embodiment that is thus configured will be described using FIG. 14. FIG. 14 is a flowchart illustrating an example of signal processing according to the fifth embodiment. FIG. 14 illustrates an example of signal processing that includes display processing in a case where the weighting factor is made modifiable.

The acquisition unit 101-5 acquires an input signal and designation information indicating the models to be used (step S501). The acquisition unit 101-5 refers to the acquired designation information to determine whether the number of models to be used is two or more (step S502).

In cases where the number of models to be used is two or more (step S502: Yes), the acquisition unit 101-5 acquires designation information indicating the weighting factor (step S503). The feature estimation unit (the feature estimation unit 102-3 or the feature estimation unit 102-4) uses the designated models and weighting factor to estimate the feature from the input signal (step S504). This processing corresponds to the feature estimation processing of FIG. 7 or FIG. 10.

The inference unit 103 uses a model of the inference unit 103 that has previously performed learning to execute inference using the estimated feature (step S505). The output control unit 104-5 uses the display screen as illustrated in FIG. 13, for example, to display the estimated feature and the inference result by the inference unit 103 (step S506).

The acquisition unit 101-5 determines whether the weighting factor has been modified via the display screen as illustrated in FIG. 13, for example (step S507). In cases where the weighting factor has not been modified and an end to the display, or the like, for example, has been designated (step S507: No), the signal processing ends.

In cases where the weighting factor has been modified (step S507: Yes), the processing returns to step S503 and the processing is repeated using the modified weighting factor. In other words, the display is switched according to the modified weighting factor.

In cases where the number of models to be used is determined in step S502 not to be two or more, that is, when the number is one (step S502: No), the feature estimation unit 102 uses the designated model to estimate the feature from the input signal (step S508). This processing corresponds to the same processing as step S102 in FIG. 2.

The inference unit 103 uses a model of the inference unit 103 that has previously performed learning to execute inference using the estimated feature (step S509). The output control unit 104-5 uses the display screen as illustrated in FIG. 12, for example, to display the estimated feature and the inference result by the inference unit 103 (step S510).

Thus, the signal processing device according to the fifth embodiment is capable of outputting a processing result in order to enable the validity of a model-derived processing result to be more suitably ascertained.

Sixth Embodiment

A signal processing device according to a sixth embodiment further comprises a function for determining whether or not to execute inference on the basis of a feature.

Figure 15:
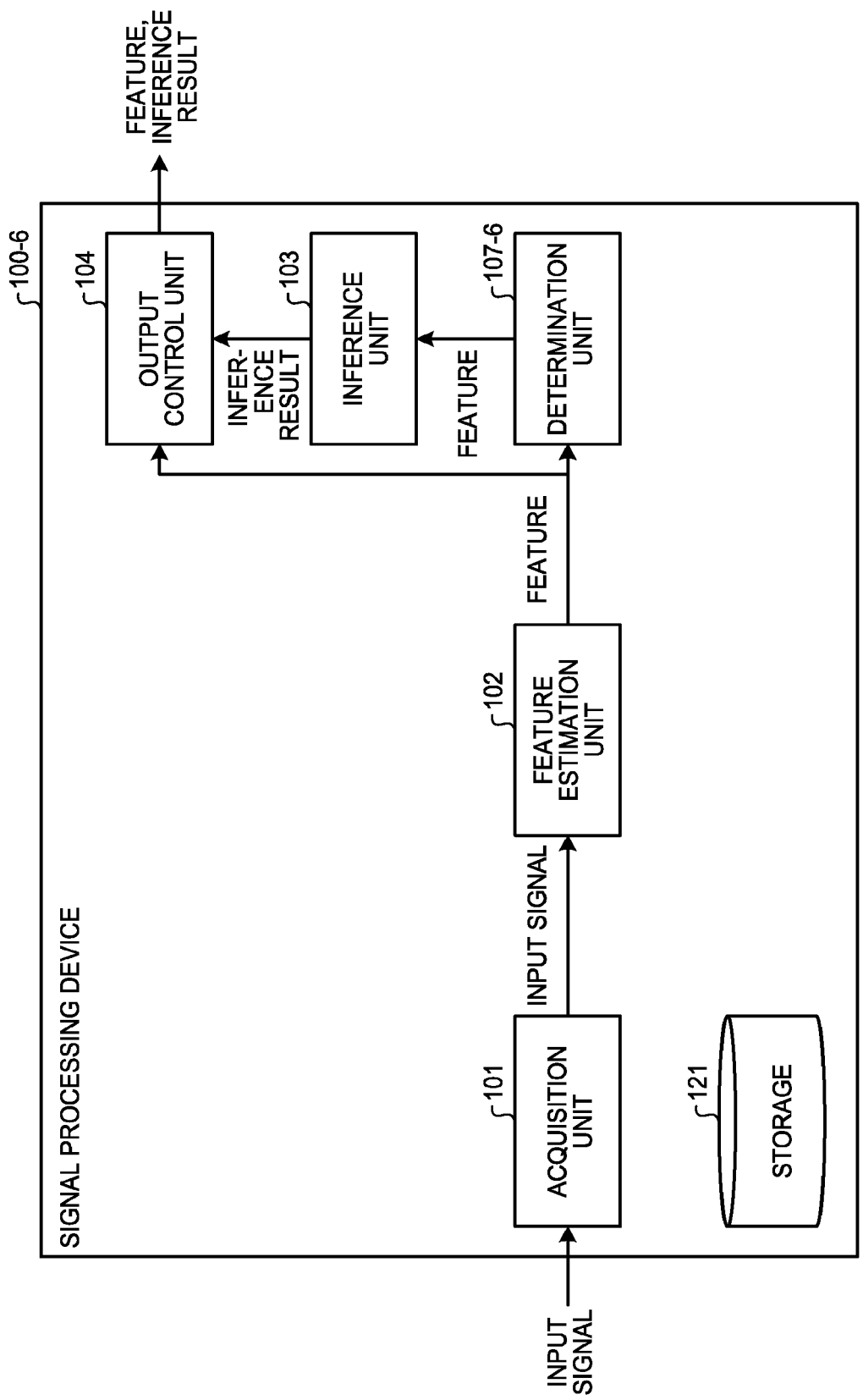
FIG. 15 is a block diagram of a signal processing device according to a sixth embodiment.

FIG. 15 is a block diagram illustrating an example of the configuration of a signal processing device 100-6 according to the sixth embodiment. As illustrated in FIG. 8, the signal processing device 100-6 comprises an acquisition unit 101, a feature estimation unit 102, a determination unit 107-6, an inference unit 103, an output control unit 104, and storage 121.

The sixth embodiment differs from the first embodiment in that the determination unit 107-6 has been added. The remaining configuration and functions are as per FIG. 1, which is a block diagram of the signal processing device 100 according to the first embodiment, and hence the same reference signs are assigned and a description thereof is omitted here.

The determination unit 107-6 determines whether or not to execute inference using the inference unit 103 on the basis of the feature estimated by the feature estimation unit 102. For example, in a case where frequency information (for example, a φ-q-n pattern and a spectrogram) representing the respective frequencies of a plurality of signals contained in a target signal is used as the feature, the determination unit 107-6 compares the sum of the elements (abnormality) contained in the frequency information with a predetermined threshold value, determining that inference is to be executed in a case where the sum is greater than the threshold value.

In a case where a partial discharge signal generated in the event of insulation breakdown is used as the target signal, minimal frequency information signifies a minimal partial discharge signal. In such a case, fault diagnosis is impossible even when inference is executed. Therefore, by executing inference only in a case where the sum is greater than the threshold value, the execution of unnecessary processing can be avoided.

Figure 16:
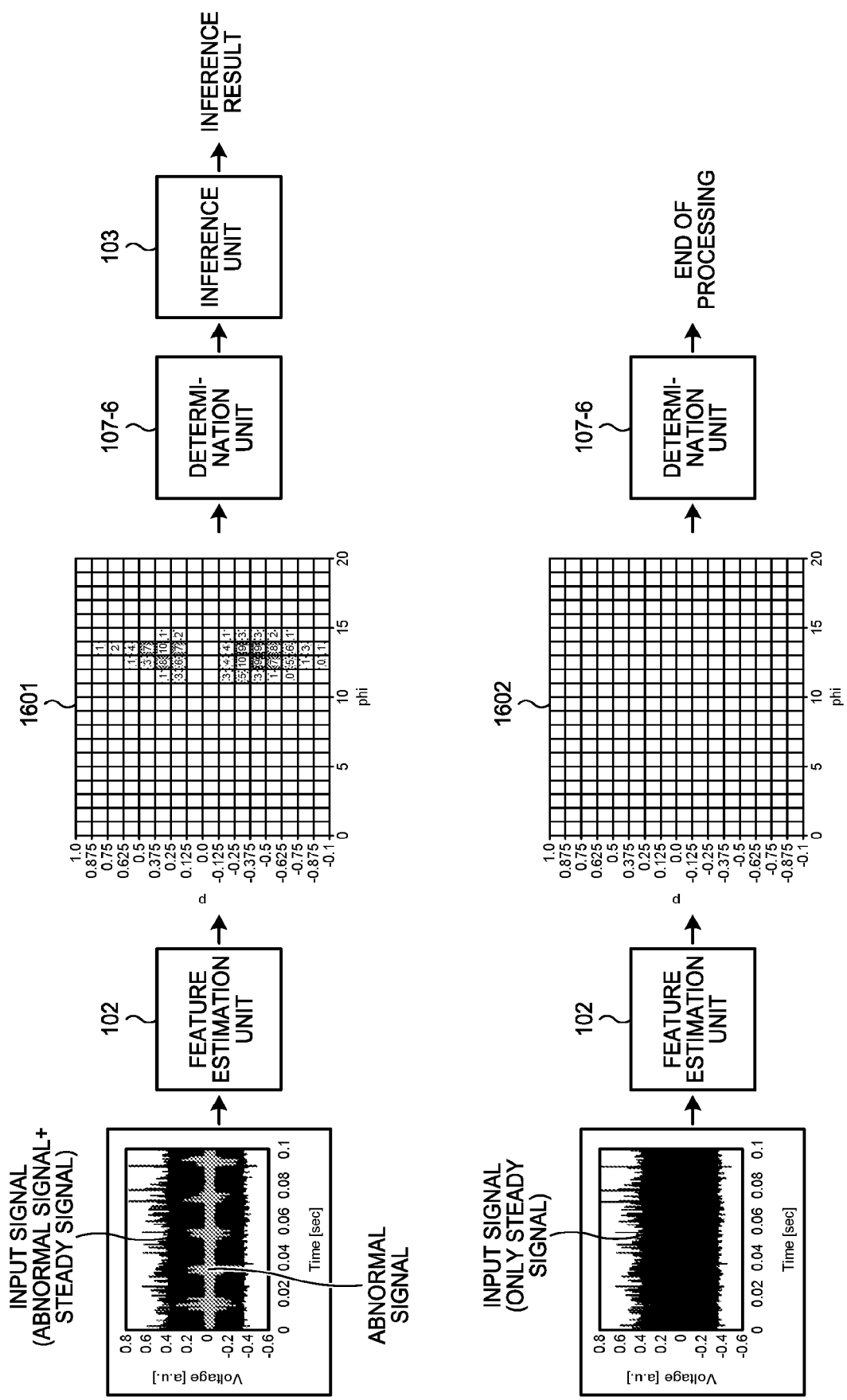
FIG. 16 is a diagram illustrating an overview of processing by a determination unit.

FIG. 16 is a diagram illustrating an overview of processing by the determination unit 107-6 in a case where partial discharge signals are taken as the target signal. The features 1601 and 1602 represent examples of frequency information (φ-q-n patterns) of partial discharge signals. The feature 1601 corresponds to a feature in a case where the input signal contains not only a steady signal but also an abnormal signal (a partial discharge signal). As illustrated in FIG. 16, the feature 1601 includes elements of a value greater than zero. In cases where the sum of the respective elements is greater than a threshold value, a determination to execute inference as illustrated in FIG. 16 is made, and the inference by the inference unit 103 is executed.

However, the feature 1602 corresponds to a feature in a case where the input signal contains only a steady signal. As illustrated in FIG. 16, the feature 1602 does not include elements of a value greater than zero. Hence, the sum of the frequencies is equal to or below the threshold value, and the determination unit 107-6 determines that inference is not to be executed.

The method for determination by the determination unit 107-6 is not limited to or by the foregoing method. The determination unit 107-6 may also execute determination processing in accordance with another criterion for avoiding unnecessary inference processing by the inference unit 103 or a criterion for enabling inference processing to be carried out more effectively by the inference unit 103.

In cases where a determination to execute inference is made by the determination unit 107-6, the inference unit 103 executes inference on the basis of the feature estimated by the feature estimation unit 102 and outputs an inference result.

Figure 17:
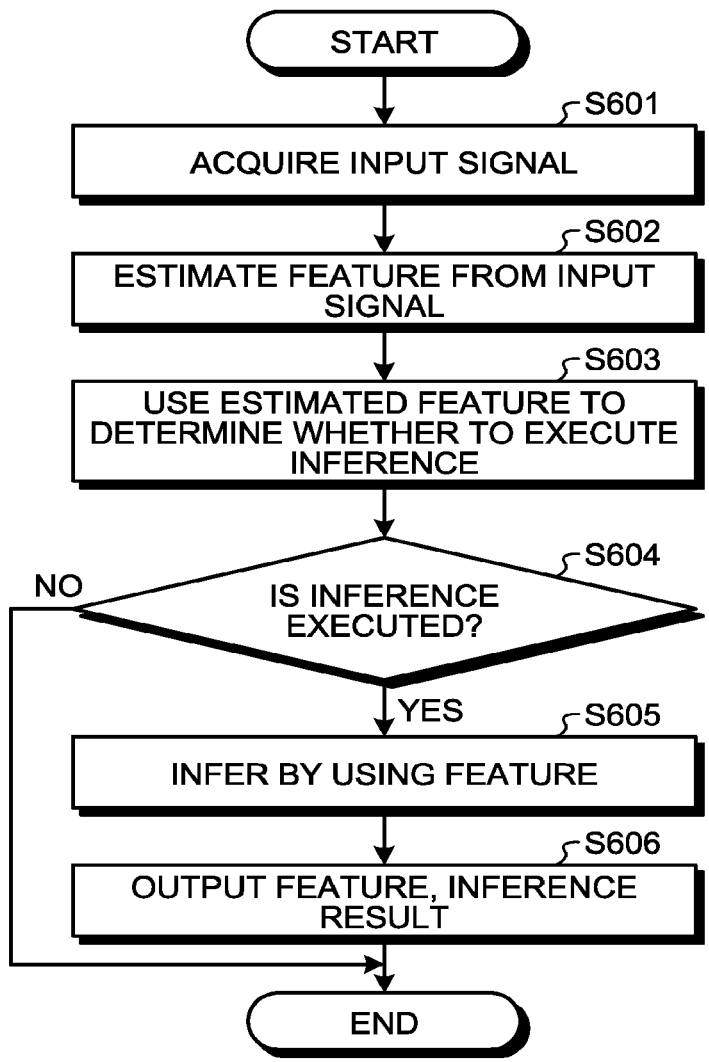
FIG. 17 is a flowchart of signal processing according to the sixth embodiment.

Next, signal processing by the signal processing device 100-6 according to the sixth embodiment that is thus configured will be described using FIG. 17. FIG. 17 is a flowchart illustrating an example of signal processing according to the sixth embodiment.

Steps S601 to S602 are the same processing as steps S101 to S102 of the signal processing device 100 according to the first embodiment, and therefore a description of these steps is omitted.

The determination unit 107-6 uses the feature estimated in step S602 to determine whether to execute inference using the inference unit 103 (step S603). For example, the determination unit 107-6 determines whether the sum of the respective elements contained in the frequency information constituting the feature is greater than the threshold value.

If a determination to not execute inference has been made (step S604: No), the signal processing ends. In cases where a determination to execute inference has been made (step S604: Yes), the inference unit 103 uses the model of the inference unit 103 that has previously performed learning to execute inference using the estimated feature (step S605). Furthermore, the output control unit 104 outputs the inference result by the inference unit 103 (step S606).

Thus, the signal processing device according to the sixth embodiment further comprises a function for determining whether or not to execute inference on the basis of a feature. Thus, the execution of unnecessary inference processing can be avoided and the processing load can be reduced.

As described hereinabove, according to the first to sixth embodiments, the validity of the processing result of a neural network on which a recognition task or the like is executed can be more suitably ascertained.

Figure 18:
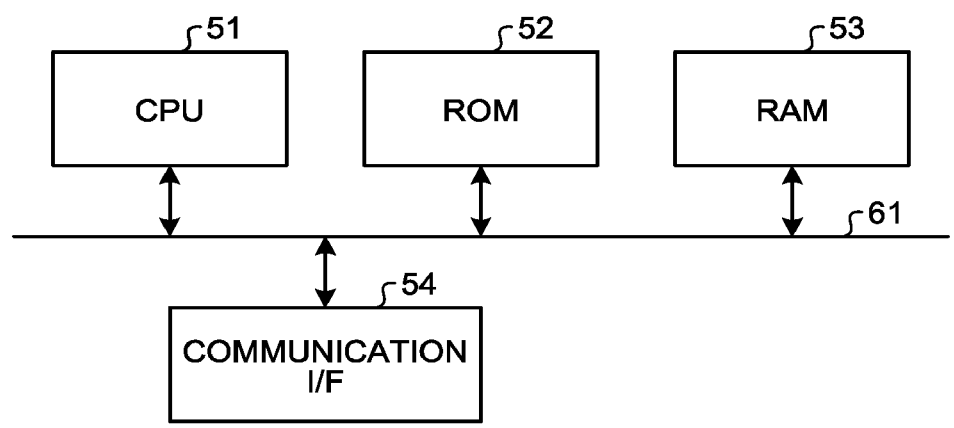
FIG. 18 is a hardware diagram of the signal processing device according to the first to sixth embodiments.

The hardware configuration of the signal processing device according to the first to sixth embodiments will be described next using FIG. 18. FIG. 18 is an explanatory drawing illustrating a hardware configuration example of the signal processing device according to the first to sixth embodiments.

The signal processing device according to the first to sixth embodiments comprises a control device such as the central processing unit 51, storage devices such as the read-only memory (ROM) 52 and the random-access memory (RAM) 53, a communication I/F 54 for performing communication through connection to the network, and a bus 61 for connecting each of the parts.

A program that is executed by the signal processing device according to the first to sixth embodiments is provided preloaded on the ROM 52, or the like.

A program that is executed by the signal processing device according to the first to sixth embodiments may be configured so as to be provided in an installable format or an executable format and as a computer program product recorded on a computer-readable recording medium such as a CD-ROM (Compact Disk Read Only Memory), a flexible disk (FD), a CD-R (Compact Disk Recordable), or a DVD (Digital Versatile Disk).

Furthermore, a program that is executed by the signal processing device according to the first to sixth embodiments may be configured to be stored on a computer connected to a network such as the internet or to be provided by being downloaded via the network. In addition, a program that is executed by the signal processing device according to the first to sixth embodiments may be configured to be provided or distributed via a network such as the internet.

A program that is executed by the signal processing device according to the first to sixth embodiments causes a computer to function as the foregoing respective parts of the signal processing device. The CPU 51 of this computer is capable of executing a program from a computer-readable storage medium by reading the program to a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing device, comprising:
one or more processors configured to:
  acquire, from a plurality of outputs, each of which is an output of a plurality of first learning models for learning, a feature of a first signal, that is an audio signal of an utterance of a speaker used for inference, by applying an input signal to each of the first learning models for learning such that the acquired feature is outputted upon inputting the input signal, the input signal being a third signal or a fourth signal, the third signal including the first signal and a second signal that is a signal unnecessary for the inference, the fourth signal being obtained by converting the third signal, wherein the acquired feature is frequency information representing respective frequencies of a plurality of signals contained in the first signal;
  display, on a display, the acquired feature by using the plurality of first learning models and the identity of the word spoken by the speaker, wherein the display comprises an interactive slide bar for designating one or more weighting factors that are used to add together, based on the one or more weighting factors, a plurality of respective features obtained based on each of the plurality of first learning models and output the addition result as the acquired feature of the first signal, and wherein designating the one or more weighting factors updates the acquired feature displayed on the display;
  execute inference by using a second learning model for learning such that an inference result is outputted upon inputting the acquired feature, the inference result being an indication of an identity of a word spoken by the speaker;
  calculate both a first error value and a second error value, the first error value constituting an error value between a first correct answer signal representing a correct answer of the acquired feature and the acquired feature, the second error value constituting an error value between a second correct answer signal representing a correct answer of inference based on the acquired feature and the outputted inference result; and
  execute a training process by executing both (1) first learning processing to update a parameter of each of the plurality of first learning models based on both the first error value and the second error value, and (2) second learning processing to update a parameter of the second learning model based on the second error value, wherein the first learning processing to update the parameter of each of the plurality of first learning models includes:
    performing a multiplying process that multiplies the first error value by a first adjustment factor and multiplies the second error value by a second adjustment factor;
    updating the parameter of the one or more first learning models based on a sum of the first error value and the second error value after the multiplying process; and
    modifying a value of the first adjustment factor and a value of the second adjustment factor such that, as a number of times of updating the parameter of the one or more first learning models increases, the first error value after being multiplied by the first adjustment factor is reduced and the second error value after being multiplied by the second adjustment factor is increased with the number of times of updating.

2. The signal processing device according to claim 1, wherein the one or more processors are further configured to set the first adjustment factor and the second adjustment factor such that the first error value after the multiplying process is greater than the second error value.

3. The signal processing device according to claim 1, wherein the parameter of each of the plurality of first learning models is having been updated based on each of a plurality of first error values based on a plurality of different indices.

4. The signal processing device according to claim 3, wherein the one or more processors are further configured to acquire the feature by using a learning model obtained by adding together the plurality of first learning models based on the one or more weighting factors.

5. The signal processing device according to claim 1, wherein the one or more processors are further configured to estimate the acquired feature by using a learning model obtained by adding together the plurality of first learning models based on the one or more weighting factors.

6. The signal processing device according to claim 1, further comprising:
a memory configured to store a plurality of stored data associating the acquired feature with the inference result, wherein
the one or more processors are further configured to read, from the memory, a predetermined number of the stored data associating features that are selected in descending order of error value with respect to the acquired feature, and display, on the display, the stored data thus read.

7. The signal processing device according to claim 6, wherein the one or more processors are further configured to match a coordinate axis displaying a particular feature contained in the stored data with a coordinate axis displaying the acquired feature.

8. The signal processing device according to claim 1, wherein:
the one or more processors are further configured to determine, based on the acquired feature, whether or not inference is to be executed, and
execute the inference in a case where a determination to execute the inference has been made.

9. A signal processing method, comprising:
acquiring, from a plurality of outputs, each of which is an output of a plurality of first learning models for learning, a feature of a first signal, that is an audio signal of an utterance of a speaker used for inference, by applying an input signal to each of the one or more first learning models for learning such that the acquired feature is outputted upon inputting the input signal, the input signal being a third signal or a fourth signal, the third signal including the first signal and a second signal that is a signal unnecessary for the inference, the fourth signal being obtained by converting the third signal, wherein the acquired feature is frequency information representing respective frequencies of a plurality of signals contained in the first signal;
displaying, on a display, the acquired feature by using the plurality of first learning models and the identity of the word spoken by the speaker, wherein the display comprises an interactive slide bar for designating one or more weighting factors that are used to add together, based on the one or more weighting factors, a plurality of respective features obtained based on each of the plurality of first learning models and output the addition result as the acquired feature of the first signal, and wherein designating the one or more weighting factors updates the acquired feature displayed on the display;

executing inference by using a second learning model for learning such that an inference result is outputted upon inputting the acquired feature, the inference result being an indication of an identity of a word spoken by the speaker;
calculating both a first error value and a second error value, the first error value constituting an error value between a first correct answer signal representing a correct answer of the acquired feature and the acquired feature, the second error value constituting an error value between a second correct answer signal representing a correct answer of inference based on the acquired feature and the outputted inference result; and
executing a training process by executing both (1) first learning processing to update a parameter of each of the plurality of first learning models based on both the first error value and the second error value, and (2) second learning processing to update a parameter of the second learning model based on the second error value, wherein the first learning processing to update the parameter of each of the plurality of first learning models includes;
performing a multiplying process that multiplies the first error value by a first adjustment factor and multiplies the second error value by a second adjustment factor;
updating the parameter of the one or more first learning models based on a sum of the first error value and the second error value after the multiplying process; and
modifying a value of the first adjustment factor and a value of the second adjustment factor such that, as a number of times of updating the parameter of the one or more first learning models increases, the first error value after being multiplied by the first adjustment factor is reduced and the second error value after being multiplied by the second adjustment factor is increased with the number of times of updating.

10. A computer program product having a non-transitory computer-readable medium including programmed instructions, wherein the instructions, when executed by a computer, cause the computer to perform:
acquiring, from a plurality of outputs, each of which is an output of a plurality of first learning models for learning, a feature of a first signal, that is an audio signal of an utterance of a speaker used for inference, by applying an input signal to each of the one or more first learning models for learning such that the acquired feature is outputted upon inputting the input signal, the input signal being a third signal or a fourth signal, the third signal including the first signal and a second signal that is a signal unnecessary for the inference, the fourth signal being obtained by converting the third signal, wherein the acquired feature is frequency information representing respective frequencies of a plurality of signals contained in the first signal;
displaying, on a display, the acquired feature by using the plurality of first learning models and the identity of the word spoken by the speaker, wherein the display comprises an interactive slide bar for designating one or more weighting factors that are used to add together, based on the one or more weighting factors, a plurality of respective features obtained based on each of the plurality of first learning models and output the addition result as the acquired feature of the first signal, and wherein designating the one or more weighting factors updates the acquired feature displayed on the display;

executing inference by using a second learning model for learning such that an inference result is outputted upon inputting the acquired feature, the inference result being an indication of an identity of a word spoken by the speaker;

calculating both a first error value and a second error value, the first error value constituting an error value between a first correct answer signal representing a correct answer of the acquired feature and the acquired feature, the second error value constituting an error value between a second correct answer signal representing a correct answer of inference based on the acquired feature and the outputted inference result; and executing a training process by executing both (1) first learning processing to update a parameter of each of the plurality of first learning models based on both the first error value and the second error value, and (2) second learning processing to update a parameter of the second learning model based on the second error value, wherein the first learning processing to update the parameter of each of the plurality of first learning models includes:

performing a multiplying process that multiplies the first error value by a first adjustment factor and multiplies the second error value by a second adjustment factor;

updating the parameter of the one or more first learning models based on a sum of the first error value and the second error value after the multiplying process; and modifying a value of the first adjustment factor and a value of the second adjustment factor such that, as a number of times of updating the parameter of the one or more first learning models increases, the first error value after being multiplied by the first adjustment factor is reduced and the second error value after being multiplied by the second adjustment factor is increased with the number of times of updating.

* * * * *